United States Patent [19]

Street

[11] Patent Number: 5,447,734
[45] Date of Patent: Sep. 5, 1995

[54] METHOD FOR PREPARING REFRIGERATED POTATO PRODUCT

[75] Inventor: Steven C. Street, Fort Fairfield, Me.

[73] Assignee: Interstate Food Processing Corporation, Fort Fairfield, Me.

[21] Appl. No.: 167,118

[22] Filed: Dec. 16, 1993

Related U.S. Application Data

[63] Continuation of Ser. No. 970,825, Nov. 3, 1992, abandoned, which is a continuation-in-part of Ser. No. 919,393, Jul. 29, 1992, abandoned, which is a continuation of Ser. No. 621,659, Dec. 3, 1990, abandoned.

[51] Int. Cl.$^6$ .............................................. A23L 1/216
[52] U.S. Cl. .................................. 426/268; 426/326; 426/327; 426/524; 426/637
[58] Field of Search ............... 426/106, 327, 268, 316, 426/326, 410, 418, 419, 324, 637, 524; 99/408; 62/114, 271

[56] References Cited

U.S. PATENT DOCUMENTS

| | | | |
|---|---|---|---|
| 2,286,618 | 6/1942 | Hiller | 62/271 X |
| 2,418,519 | 4/1947 | McBeth | 99/408 X |
| 2,525,045 | 10/1950 | Richardson | 62/271 X |
| 2,556,250 | 6/1951 | Bauman | 62/271 X |
| 3,773,527 | 11/1973 | Ruggerone | 426/106 |
| 4,569,277 | 2/1986 | Stiglich | 99/408 X |
| 4,579,743 | 4/1986 | Hullah | 426/637 X |
| 4,933,411 | 6/1990 | Gifford | 426/326 X |
| 4,957,761 | 9/1990 | Hale | 426/410 |

OTHER PUBLICATIONS

Smith, *Potatoes: Production, Storing, Processing,* 2nd ed., 1977, pp. 692–697.
Furia, CRC Handbook of Food Additives, 2nd ed., vol. I, 1972, pp. 129 & 283.
Food Engineering, Oct. 1986, "Acidulants Find Growth Niches In Mature Market", pp. 83–88.
Samuels, "Films, Polvinylidene Chloride (Saran)", *Packaging,* 1986 Reference Issue, p. 73.

*Primary Examiner*—Arthur L. Corbin
*Attorney, Agent, or Firm*—Larson & Taylor

[57] ABSTRACT

Potato products are preserved for extended storage at refrigeration temperatures by a process wherein the potatoes are peeled, cut, cooked in a solution of heated water and preservatives, or a solution of steam and preservatives, dried, and then air cooled to between 30° F. to 34° F. The air cooled potato products are vacuum packaged in carbon dioxide and stored at refrigeration temperature.

13 Claims, 2 Drawing Sheets

METHOD FOR PREPARING REFRIGERATED POTATO PRODUCT

CROSS-REFERENCE TO RELATED APPLICATIONS

This application is a continuation of application Ser. No. 07/970,825 filed Nov. 3, 1992, which in turn is a continuation-in-part of U.S. application Ser. No. 07/919,393, filed Jul. 29, 1992, which is a continuation of U.S. application Ser. No. 07/621,659, filed Dec. 3, 1990, all now abandoned.

FIELD OF THE INVENTION

This invention relates to a method of preserving pre-cut cooked potatoes for storage at refrigeration temperatures and the product produced thereby.

BACKGROUND OF THE INVENTION

Pre-peeled and pre-cut potatoes are immensely popular among consumers. Most typically, these potatoes must be stored in the freezer. Consequently, the potatoes do not always have the desirable taste and consistency of a fresh potato product.

Several prior art patents have suggested methods of preserving potatoes at refrigeration temperatures. For example, in U.S. Pat. No. 3,773,527 (Ruggerone) the potatoes are cooked such that they are soft all the way through, dipped in a preservative, and then cut into desired shapes.

U.S. Pat. No. 4,228,196 (Weaver, et al.) describes another process for preparing pre-cooked potato products. This process involves cooking raw potatoes at 81°–83° C. for 5 to 45 minutes, then heating the partially cooked potatoes to reduce the moisture content thereof, cooking the potatoes at 50°–100° C. for another period of 5 to 45 minutes, and, finally, preserving the potatoes in the absence of starch suspensions.

U.S. Pat. No. 4,579,743 (Hullah) describes a method of preparing par-fried sliced potato products wherein surface sugar molecules and starch molecules are first cross-linked, then the cross-linked potato is water blanched and soaked in a solution containing an oxidizing agent, a non-reducing sugar, and an antioxidant preservative. The potatoes are then parfried, cooled and packaged in an inert gas and $CO_2$ mixture to inhibit microbiological growth.

U.S. Pat. No. 4,957,761 (Hale) teaches a method of preserving pre-cut, uncooked potatoes for storage at refrigeration temperatures, wherein pre-cut uncooked potatoes are blanched to seal the outer surfaces without cooking the inside of the potato. The potatoes are then rapidly cooled in water, dried and vacuum packaged.

All of these prior art methods of preserving potatoes at refrigeration temperatures tend to increase moisture content of the potato product thereby yielding a limp, soggy potato product. Consequently, there is a need in the art for making fresh, pre-cut potatoes available in the refrigerator sections of the supermarket and in institutional food service markets, which are ready to be heated and or browned without the need for further preparation.

SUMMARY OF THE INVENTION

It is, therefore, an object of the present invention to provide an improved method of preparing pre-cut potatoes for extended storage at refrigeration temperatures which comprises the sequential steps of:

cooking precut potatoes in a solution of preservatives, whereby said potatoes are impregnated with said preservatives;

drying said potatoes in the presence of substantially purified air to reduce surface moisture;

cooling said potatoes in purified air for a time sufficient to reduce moisture content to less than 75%; and vacuum packaging said potatoes in carbon dioxide.

It is yet another object of the present invention to provide a cooker for continuously cooking pre-cut potatoes comprising:

a tank;

means for circulating potatoes through said tank;

filter means for removing fines;

means for introducing chemicals into said tank; and means for injecting steam into said tank to control temperature.

Other features and advantages of the invention will be set forth in, or apparent from, the following detailed description of preferred embodiments of the invention.

DETAILED DESCRIPTION OF THE PREFERRED EMBODIMENTS OF THE INVENTION

The present invention comprises a method for producing pre-cut cooked potatoes for storage at refrigeration temperatures. The method is a continuous process which requires a processing time of approximately 45 minutes from the time the potatoes are first peeled until they are packaged and placed in refrigerated storage. Thus, the contamination exposure time for the cut potatoes is minimized, making it possible to store the potatoes for an extended time period, while retaining freshness & taste.

According to the method of the present invention, raw potatoes having a moisture content of approximately 80% are first unloaded into a measuring hopper. The potatoes are then conveyed through a series of cleaning equipment during which rocks and vines are eliminated, the potatoes are washed and under- or oversized potatoes are eliminated. The potatoes are then steamed at a temperature of 300° F. to remove the peel. A series of scrubbers is used to remove any remaining peel. The peeled potatoes are then placed in cool water in a holding tank at about 45° F. to 55° F. The cool water removes excess starch or other materials on the surface of the peeled potatoes and aids in preserving the potatoes for a short period of time prior to their being cut. The peeled potatoes are then pumped to a dewatering shaker and finally to a cutter where they are cut into the desired shape (e.g. shredded, hash browns, french fries, diced, sliced, etc.).

The potatoes may be cooked using any of a number of types of commercially available processing equipment, such as Reel or Mat type blanchers. The required cook time most typically ranges from about 20 to 30 minutes and is dependent on the size and cut of the potatoes and the type of processing equipment. The required cook temperature typically ranges from 180° to 195° F. A solution comprising steam and preservatives or water and preservatives is also added during the cooking process. In one embodiment of the invention, for example, potatoes are conveyed under a hood on a steam injected belt and the preservatives are chemically educted in with the steam.

Figure 1:
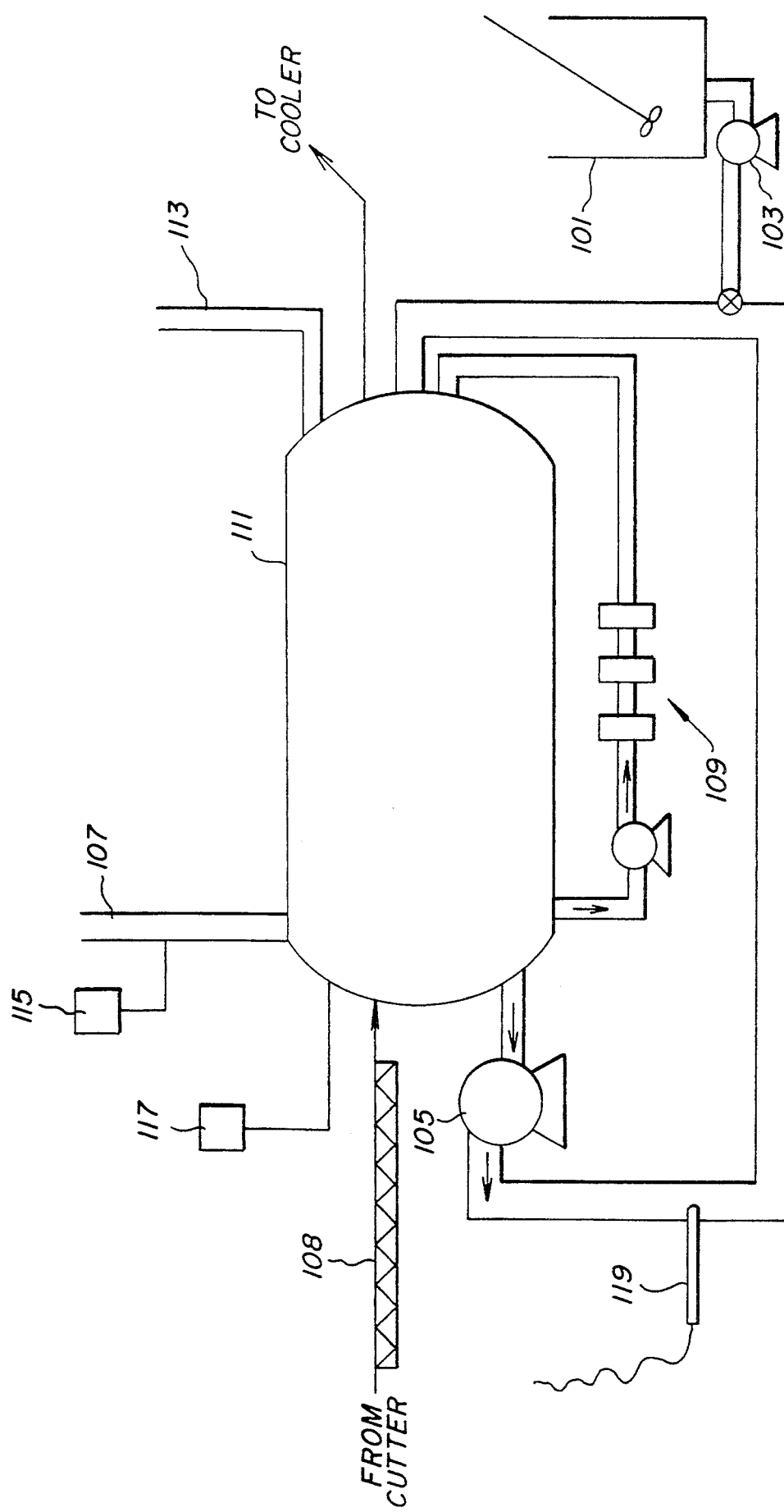
FIG. 1 shows a positive displacement cooker utilized in a preferred embodiment of the invention.

In the most preferred embodiment of the invention, the potatoes are cooked using the specially designed positive displacement cooker 111 of the present invention as shown in FIG. 1. The potatoes enter the cooker 111 after being cut and passing over an inspection shaker 108. Preservatives are dissolved in water in a remote chemical mix tank 101 and continuously metered into the cooker 111 through metering pump 103. Most preferably the preservatives are added to the recirculation line 121 at the discharge side of a recirculation pump 105 to form a cooker solution of water and preservatives which are then combined with the pre-cut potatoes and circulated through the cooker 111. The residence time of the potatoes in the cooker 111 is controlled by regulating the speed, via speed controller 117, of either a screw, reel or similar device (not shown) used to convey the potatoes through the cooker 111. The recirculation pump 105 recirculates the cooker solution, drawn from various locations in cooker 111, at a rate of 1000–1200 gallons/minute. By recirculating the cooker solution at a high flow rate, a homogeneous mixture of potatoes and preservatives is achieved throughout the cooker. Moreover, the potatoes, which enter the cooker at a temperature of about 50° F., are quickly heated to the ultimate cook temperature. Preferably, the temperature in cooker 111 is maintained at least at 190°±0.1° F. since this temperature will ensure the absence of bacteria. The temperature is controlled using controller 115 which regulates the injection of steam from steam line 107 into the bottom of the cooker 111. Most preferably, system temperature is measured via a temperature probe 119 in recirculation line 121 and the steam injection is controlled using a PID controller. Deionized make-up water is fed to the cooker 111 via line 113. The cooker 111 is further equipped with a series of 3 canister, or Cuno, filters 109 which remove fines. Most preferably, the filters are sequentially arranged and are 100, 80 and 60 microns in size.

The preservatives added to the potatoes from tank 101 in the method of the invention can be one or more of the non-toxic preservatives commonly added to preserve foods and include, by way of example, citric acid, potassium sorbate, ascorbic acid, erythorbic acid and sodium acid and pyrophosphate. Potassium sorbate has been found to control yeast and mold growth on the refrigerated product. The citric acid is used to lower the pH of the cooking solution to slightly below 3.5 to inhibit enzyme activity and also to function as a chelating agent, thus sealing the outer surfaces of the cut food pieces and preventing starches from bleeding out of the inside of the potato during storage and cooking. The ascorbic acid acts as an oxygen scavenger and a reducing agent which, in combination with the erythorbic acid, prevents auto-oxidation of the ascorbic acid and prevents browning of the cut food pieces. Sodium acid pyrophosphate is a brightener to help maintain a fresh white appearance for the cut food pieces. Adding the preservatives to the cooking water or steam results in the preservatives actually being cooked throughout the cut food potato pieces, thus greatly enhancing their effectiveness and extending the shelf life of the final packaged product. In a preferred embodiment, the preservatives used in the cooking solution comprise 0.2% by weight of potassium sorbate, 3% by weight of citric acid, 0.3% by weight of ascorbic acid, 0.2% by weight of erythorbic acid, and 0.1% by weight of sodium acid pyrophosphate.

Upon completion of the cooking process, the potato pieces are dried in purified air, preferably high velocity air at a temperature of about 120°–135° F., to reduce the surface moisture, retrograde the surface starches and further reduce microbiological activity. At this point, the moisture content of the potato pieces should be reduced to at least 77% and is most preferably reduced to 75%. The potato pieces are then removed to a cooling chamber where they are subjected to clean, cold air at high velocity to further reduce product temperature to between 30° F. to 34° F., most preferably below 32° F., for a time sufficient to reduce the internal moisture content to 70% or less. The dry cooling air to which the cut food potato pieces are subjected is specially filtered and purified to remove dust, spores, organisms and any other contaminating particles of a size greater than 0.4 microns. The entire cooling process requires approximately 10–15 minutes, depending on the size, cut etc. of the potatoes, and may be performed using standard equipment such as multi-pass high velocity, boundary layer removing cooling chambers. Preferably, cut food potato pieces are further subjected to ultraviolet light to prevent any possible contaminants from being blown onto the surfaces of the cut potato product.

Figure 2:
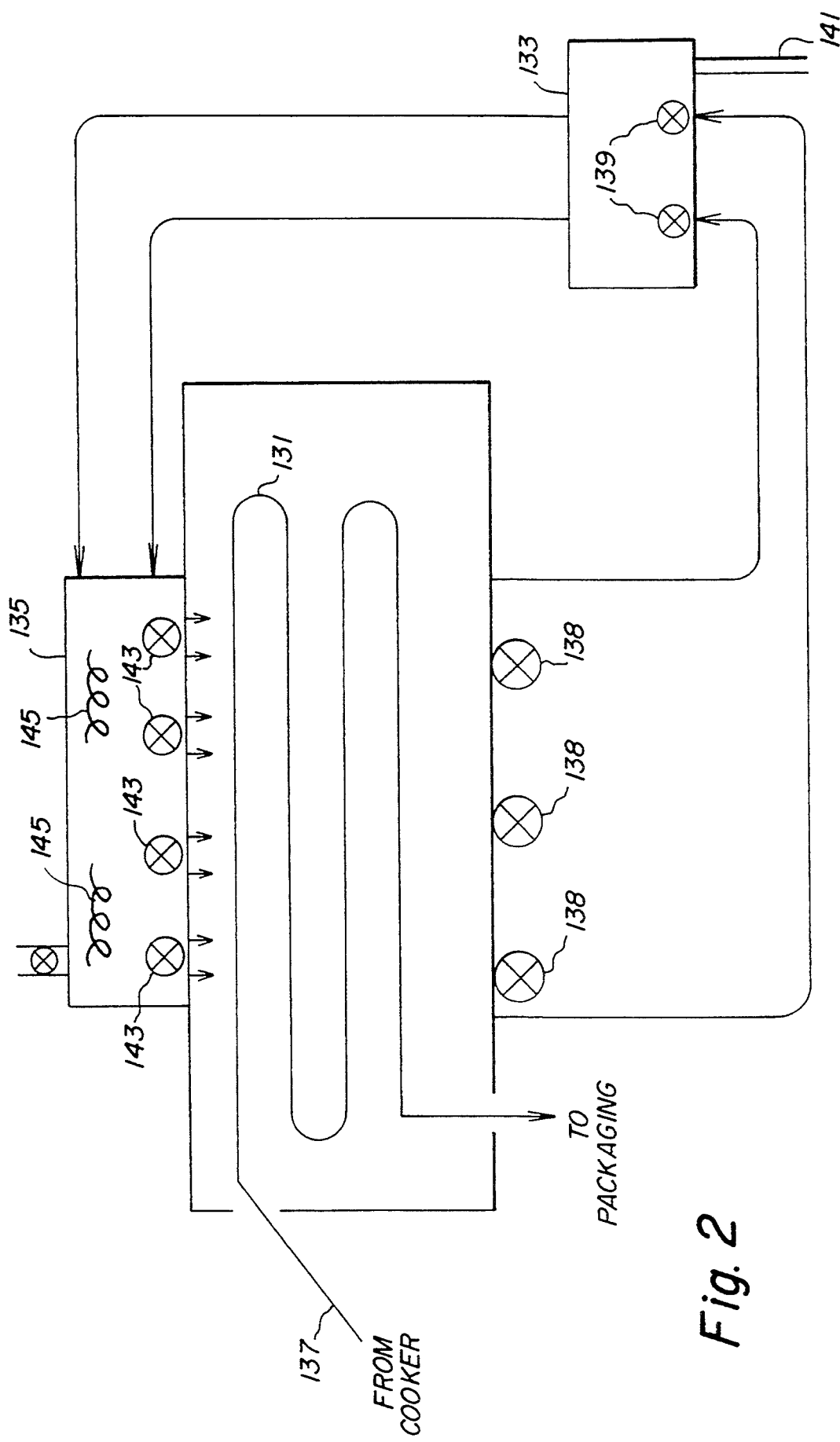
FIG. 2 shows a cooling chamber utilized in a preferred embodiment of the present invention.

In a preferred embodiment shown in FIG. 2, the cooling chamber is comprised of a four pass conveyor 131, a glycol absorption system 133 to purify and dry the air and an ammonia refrigeration system 135 to cool the air. Potato pieces enter the four pass conveyor system 131 from cooker 111 on an inclined belt 137. Purified cooling air from the ammonia refrigeration system 135 is then blown over the potato pieces using high velocity fans 143. The air removes any moisture, and contaminating particles from the potatoes. The air is then removed from the four pass conveyor system using discharge fans 138 and drawn into the glycol absorption system using suction fans 139. Glycol purifies the air and absorbs the moisture, which is then boiled out of the glycol and discharged as water via line 141. The purified air from the glycol absorption system 133 is then discharged to the ammonia refrigeration system 135 where it is cooled using cooling coils 145.

Finally, the cut potato pieces are vacuum packaged. The package is first evacuated and then injected with carbon dioxide ($CO_2$). Unlike nitrogen which is typically utilized in the prior art processes, $CO_2$ is absorbed by the potatoes thereby inhibiting further microbiological growth, inhibiting the formation of carboxylic acid and causing the bag to form-fit around the potatoes.

The packaging material, in the preferred embodiment, is a 60 gauge B.O.N./P.V.D.C. The sealant is a 2 mil L.L.D.P.E. sealant. This material is preferred since oxygen permeability of the bag is less than 1 cc per 100 square inches of surface area during any 24 hour period of time at room temperature, i.e., approximately 73° F. at 0% relative humidity. Moisture vapor transmission in this preferred packaging material is approximately 0.3 grams per 100 square inches per 24 hours at 100° F. and 90% relative humidity. Thus, the packaging is relatively impervious to oxygen and water contamination.

Finally, the sealed package goes immediately to refrigeration. Preferred refrigeration temperatures are from between 32° F. and 34° F. Storage at controlled temperature has consistently yielded a shelf life of over 45 days.

In summary, the present invention permits pre-cut, fully-cooked, non-frozen potatoes to be preserved under refrigeration conditions, without the addition of sulfites, for a period of time long enough to allow the potatoes to reach the ultimate consumer in an unspoiled condition. Non-frozen potatoes not only have more of the nutrients present, but also taste much fresher than the frozen varieties. Because they are fully cooked, they also require less preparation time.

While there is shown and described the present preferred embodiments of the invention, it is to be distinctly understood that this invention is not limited thereto but may be variously embodied to practice within the scope of the following claims.

What is claimed is:

1. A continuous process for potatoes for extended storage at refrigeration temperatures comprising the sequential steps of:
    cutting peeled potatoes into a shape of a desired potato product;
    fully cooking said cut potatoes in a solution of non-sulfite preservatives to impregnate said cut potatoes with said non-sulfite preservatives and to thoroughly treat all exposed surfaces of said cut potatoes;
    drying said cooked potatoes in the presence of substantially purified air to reduce surface moisture;
    cooling said dried potatoes in said purified air for a time sufficient to reduce internal moisture content to 70% or less;
    vacuum packaging said cooled potatoes in carbon dioxide; and
    storing said vacuum packaged potatoes at a controlled refrigeration temperature to achieve an extended shelf life.

2. The continuous process according to claim 1 wherein said step of cooking comprises heating said potatoes at a temperature of 180° to 195° F. for 20 to 30 minutes.

3. The continuous process according to claim 2 wherein said temperature is 190°±0.1° F.

4. The continuous process according to claim 1 wherein said solution has a pH of 3.3 to 3.5.

5. The continuous process according to claim 1 wherein said solution of non-sulfite preservatives is selected from the group consisting of potassium sorbate, citric acid, sodium acid pyrophosphate, ascorbic acid, erythorbic acid, sugar and mixtures thereof.

6. The continuous process according to claim 1 wherein said step of cooling is performed using a glycol absorption system to remove moisture and contaminating particles from air, thereby producing purified air and then using an ammonia refrigeration system to cool said purified air.

7. The continuous process according to claim 1 wherein said step of cooking is performed in a positive displacement cooker.

8. The continuous process according to claim 1 wherein said solution comprises steam and non-sulfite preservatives.

9. The continuous process according to claim 8 wherein the temperature in said cooker is controlled by steam injection.

10. The continuous process according to claim 1 wherein said solution comprises water and non-sulfite preservatives.

11. The continuous process according to claim 1 further comprising the step of storing said potatoes at a temperature of 32° to 34° F. after said vacuum packaging.

12. A continuous process for preparing cooked pre-cut potatoes comprising the sequential steps of:
    cutting peeled potatoes into a shape of a desired potato product;
    circulating said cut potatoes in a cooker solution, comprising non-sulfite preservatives and water, through a positive displacement cooker to fully cook and impregnate said cut potatoes with said non-sulfite preservatives and to reduce dissolved oxygen content in said solution whereby growth of bacteria is inhibited;
    drying said cooked potatoes in the presence of substantially purified air to reduce surface moisture;
    cooling said dried potatoes in said purified air for a time sufficient to reduce internal moisture content to 70% or less;
    vacuum packaging said cooled potatoes in carbon dioxide, said cooled potatoes absorbing the carbon dioxide to inhibit microbiological growth; and
    storing said vacuum packaged potatoes at a controlled refrigeration temperature to achieve an extended shelf life.

13. The continuous process of claim 12 further comprising the step of recirculating said cooker solution through said positive displacement cooker at a rate of 1000 to 1200 gallons/minute.

* * * * *